May 10, 1966  R. L. ANSPACH  3,250,656
METHOD OF MAKING HONEYCOMB STRUCTURES
Filed July 11, 1963  3 Sheets-Sheet 1

INVENTOR.
Roy L. Anspach
BY
Wood, Herron and Evans
ATTORNEYS

May 10, 1966  R. L. ANSPACH  3,250,656
METHOD OF MAKING HONEYCOMB STRUCTURES
Filed July 11, 1963  3 Sheets-Sheet 2

INVENTOR.
Roy L. Anspach
BY
Wood, Herron and Evans
ATTORNEYS

May 10, 1966  R. L. ANSPACH  3,250,656
METHOD OF MAKING HONEYCOMB STRUCTURES
Filed July 11, 1963  3 Sheets-Sheet 3

INVENTOR
Roy L. Anspach
BY
Wood, Herron & Evans
ATTORNEYS

United States Patent Office 3,250,656
Patented May 10, 1966

3,250,656
METHOD OF MAKING HONEYCOMB STRUCTURES
Roy L. Anspach, Orange, Calif., assignor, by mesne assignments, to Aeronca Manufacturing Corporation, Middletown, Ohio
Filed July 11, 1963, Ser. No. 294,451
4 Claims. (Cl. 156—184)

The present invention relates to a method of making honeycomb structures from very thin sheet material, and to apparatus suitable for carrying out the method.

Honeycomb structures are well known and highly developed and are used for a variety of structural purposes. When honeycomb is made from relatively heavy material such as sheet steel the adjacent sheets of the structure are generally welded together; but when thinner or weaker materials such as paper or aluminum foil are utilized, it has been the practice to glue the adjacent sheets of material to each other. In the latter instance the method of fabrication in common usage has been to provide a plurality of separate flat sheets of the material, and then to apply the glue lines to each such flat sheet by means of a roller similar to that used in printing processes. After the gluing the flat sheets are subjected to a drying process. Thereafter a selected number of the flat sheets are assembled together in a flat package assembly, and heat and pressure are concurrently applied for the purpose of causing the glue lines on each sheet to become secured to the immediately adjacent sheet. After all the sheets of the package have thus been secured together the final step of the process is to expand the package, in a direction normal to the plane thereof, so as to form the completed honeycomb structure.

As is well known, the cells in the completed honeycomb structure have essentially a modified square configuration. This result is achieved by locating the glue lines between the first and second sheets of the assembly a fixed interval apart, then locating the glue lines between the second and third sheets the same fixed interval apart but staggered by one-half a spacing interval relative to the first set of glue lines, and so on. When the package is stretched or expanded by pulling the first and last sheets apart each of the sheets in the package bends in one direction at the location of each glue line on one of its surfaces, and in the opposite direction at each glue line on its other surface.

The method used heretofore as outlined above is very slow, expensive, and inefficient.

Therefore, the principal object and purpose of the present invention is to provide a novel method or precess for forming honeycomb structures from very thin sheet material.

A further object of the invention is to provide such a novel method or process having a distinctly higher degree of efficiency than processes hitherto known.

A further object of the invention is to provide such a novel method or process which is adapted to be carried out at a very high speed by means of automatic machinery.

An additional object of the invention is to provide suitable apparatus for carrying out the novel method of this invention.

For the purposes of the present invention it is significant to note that in commercial applications of honeycomb structure the cell length is sometimes several inches, but far more frequently is only about one inch.

In accordance with the present invention a take-up drum of rather large diameter is used as a jig or mandrel for carrying out the first step of the novel process. The thin sheet material is made available in a long continuous strip, as for example, from a conventional supply roll. In carrying out the first step of the process the continuous strip of sheet material is wound about the drum to provide a desired number of layers of sheet material on the drum.

In addition to the winding drum, which preferably rotates at very high speed, separate means are provided for continuously securing the strip to the outer layer of the multi-layer assembly previously wound upon the drum. For example, a glue applicator is used which is capable of applying glue to a plurality of separate points on the surface of the continuous strip of sheet material. The glue is applied while the sheet material is being wound upon the drum, and the applicator is actuated in such a way as to move the points of application of the glue in a direction parallel to the longitudinal axis of the drum. More specifically, there is a uniform spacing between adjacent points of the application of the glue, measured in a direction traverse to the continuous strip of sheet material, and while the drum is rotating one complete revolution the points of application of the glue are moved transversely of the strip of sheet material by a distance equal approximately to one-half of the space between adjacent points of application. The result is that, when the winding on the drum is completed, each set of glue lines that lies between two successive layers of the sheet material is staggered by one-half the glue line spacing relative to the set of glue lines above it and also relative to the set of glue lines below it.

The second major step of the process of the present invention is to cut the accumulated layers of sheet material on the drum into a plurality of separate packages, each separate package being obtained by cutting along a parallel pair of lines which also lie parallel to the longitudinal axis of the drum (but transverse to the strip of sheet material). Since the drum diameter is very large and since the desired length of cell in the completed honeycomb structure is rather small, the angular separation on the surface of the drum between the two cutting lines for each individual package is of the general order of magnitude of one or a very few degrees. It therefore follows that each such multi-sheet package, while having a definite curvature in the direction circumferential to the drum, nevertheless differs from an absolutely flat configuration by a fairly negligible amount.

The third and final major step of the process of the present invention is to stretch or expand each such separate package, in an entirely conventional manner, so as to form the completed honeycomb structure that is desired.

The objects and advantages of the invention, and the details of one manner of carrying it into effect, will be more readily understood from the accompanying drawings, in which.

Figure 1:
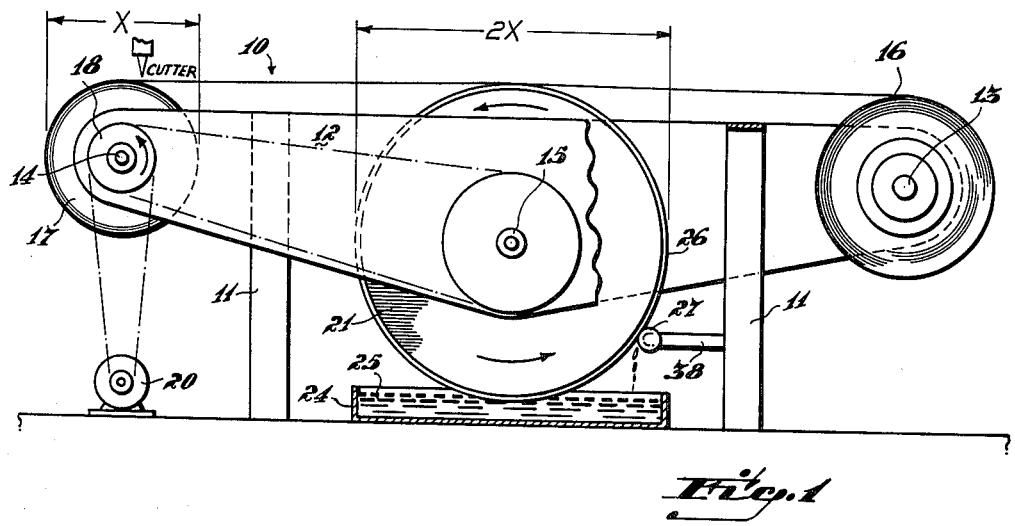
FIGURE 1 is an elevation view of one form of apparatus suitable for carrying out the method of the present invention.
Figure 2:
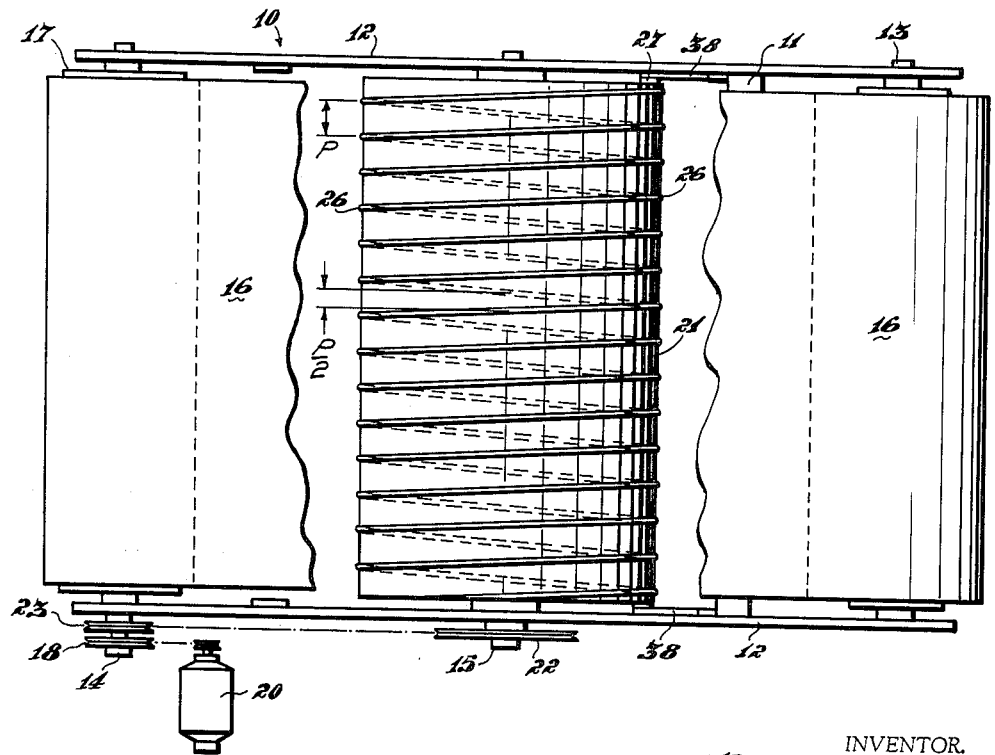
FIGURE 2 is a top plan view of the apparatus of FIGURE 1.

Referring now to FIGURES 1 and 2 of the drawings, the apparatus there illustrated is seen to include a frame indicated generally at 10 including a pair of U-shaped supporting members 11 each of which supports the corresponding end of a pair of side frame members 12. The side frame members 12 provide suitable bearings for shafts 13 and 14 which are located at respective ends of the apparatus, and also for a shaft 15 which is located in the approximate center of the apparatus. Shaft 13 carries a supply roll that provides a continuous strip of sheet material 16, which is paper, aluminum foil, fiberglass, or other material from which the honeycomb structure is to be fabricated. The take-up drum previously referred to as providing the jig or mandrel is identified at 17 and is mounted on and driven by the shaft 14. A motor 20 and pulley 18 impart rotating drive to the shaft 14 for the purpose of drivingly rotating the drum 17 and thereby pulling the strip of sheet material 16 the full length of the frame 10 and continuously winding it upon the drum 17. Drum 17 may, for example, be ten feet in diameter.

In the particular form of the apparatus illustrated in FIGURES 1 and 2 the glue applicator is located a considerable distance from the drum 17. A glue applicator drum 21 is carried on the shaft 15, and as indicated by the notations x and 2x in FIGURE 1, the diameter of drum 21 is twice the diameter of the drum 17. A pulley 22 on the shaft 15 is driven from a pulley 23 on the shaft 14, and in order to drive both of the drums 17 and 21 at the same surface velocity the pulley 22 is made twice the diameter of the pulley 23. A pan or reservoir 24 is disposed below drum 21 and contains a supply of glue or other adhesive material 25. A wiper roller 27 is provided on the side of drum 21 that is furthest from the drum 17, the wiper roller being mounted on a pair of arms 38 secured to the corresponding U-shaped frame member 11. The wiper roller serves to remove excess adhesive from the drum 21 prior to the engagement of the surface thereof with the strip 16 of sheet material.

In order to apply glue or adhesive to the strip 16 at a plurality of separate points, and to continuously move the points of application in a direction parallel to the longitudinal axis of the drum 17, the glue application drum 21 is provided with a helical rib or thread 26 extending over its entire surface. The pitch P of this thread or rib is clearly indicated in FIGURE 2.

When the winding drum 17 rotates one complete revolution the glue applicator drum 21 rotates only a half revolution; therefore, the points of application of glue on the strip 16 are shifted only one-half the distance P during each rotation of the drum 17. This relationship is readily apparent from the geometry of the apparatus as shown in FIGURES 1 and 2.

Figure 3:
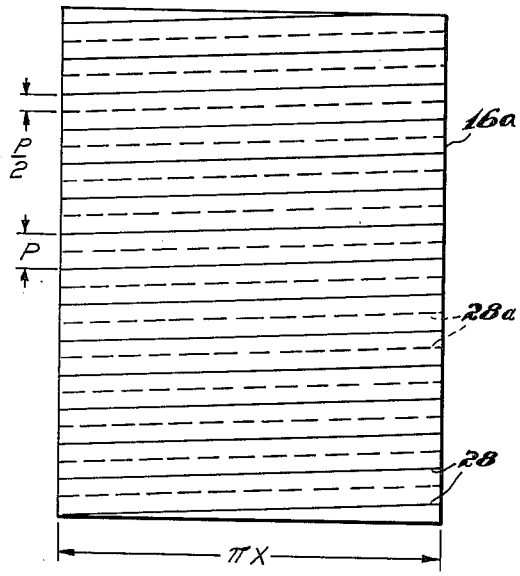
FIGURE 3 is a layout drawing showing the location of glue lines on both surfaces of a section of sheet material whose length corresponds to the circumference of the drum.

After a desired number of layers of the sheet material have been wound upon the drum 17 the operation of the apparatus is stopped, and the unattached portion of the strip 16 is cut away or detached from the portions of the sheet material that have become wound upon the drum by means of suitable cutter means shown diagrammatically in FIGURE 1. The relationship at this time of each layer of sheet material upon the drum to the glue lines on its inner and outer surfaces is illustrated in FIGURE 3. FIGURE 3 shows a single layer of the sheet material 16a, having a length $\pi X$, the circumference of the drum 17, as it would appear after being detached from the drum and layed in a flat configuration. The glue lines on top of the sheet are indicated by solid lines 28 while the glue lines underneath the sheet are indicated as dotted lines 28a. It will readily be seen that the set of glue lines 28 and the set of glue lines 28a have a staggered relationship relative to each other, being separated by one-half a glue line interval.

Figure 4:
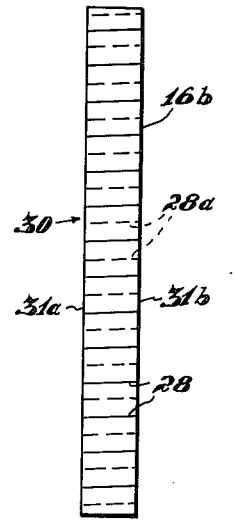
FIGURE 4 is a top plan view of a separate multi-sheet package that is cut from the surface of the drum in accordance with the invention.

When the apparatus is stopped the drum 17 may, for example, carry 50 layers of the sheet material 16b. A plurality of separate packages or multi-sheet assemblies 30 are cut from the drum by suitable cutter means such as those shown diagrammatically in FIGURE 1, each being cut along a pair of lines such as 31a, 31b, which are parallel to each other and to the longitudinal axis of the drum. Such a separate package or assembly is illustrated in FIGURE 4. The cell length as shown in FIGURE 4 is, however, exaggerated relative to the drum circumference as shown in FIGURE 3.

Figure 5:
FIGURE 5 is an end view of the package or assembly of FIGURE 4.
Figure 6:
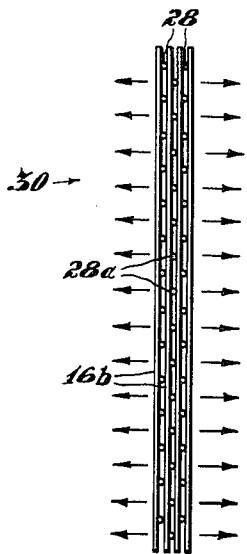
FIGURE 6 is a side view of the package of FIGURE 4.

FIGURE 5 is similarly exaggerated to show the curvature of the package of FIGURE 4, which in an actual case is far less than illustrated. In actual practice the cutting lines 31a and 31b are separated by a circumferential distance not substantially greater than one degree. FIGURE 6 is an end view of the package showing a first set of glue lines 28, a set of glue lines 28a staggered relative thereto, and a second set of glue lines 28 that are staggered relative to the set 28a but are in alignment with the first set 28. For simplicity of illustration FIGURES 5 and 6 show the package 30 as containing only four of the sheets 16b.

Figure 7:
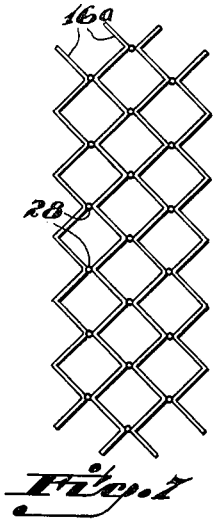
FIGURE 7 shows the completed honeycomb structure formed by expanding the package of FIGURE 4.
Figure 8:
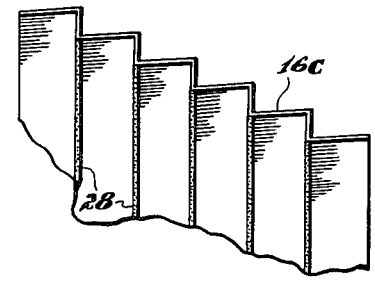
FIGURE 8 is a fragmentary perspective view of an individual sheet of the honeycomb structure of FIGURE 7, showing the glue lines on one side thereof.

It will be recognized that once a package or assembly 30 such as shown in FIGURE 4 has been cut from the winding drum the completion of the process is entirely conventional. FIGURE 7 illustrates the resulting configuration of the honeycomb structure after the first and last sheets of the package have been stretched apart in the customary manner. The individual sheets forming the honeycomb structure have been labeled 16c. The final configuration of one of the sheets 16c is shown in FIGURE 8.

Figure 9:
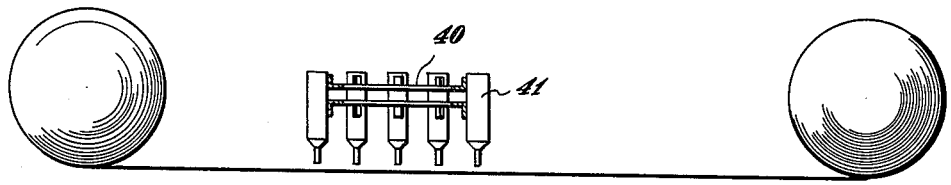
FIGURE 9 is a diagrammatic elevational view of a modification of the apparatus in which adhesive is applied by plurality of nozzles.
Figure 10:
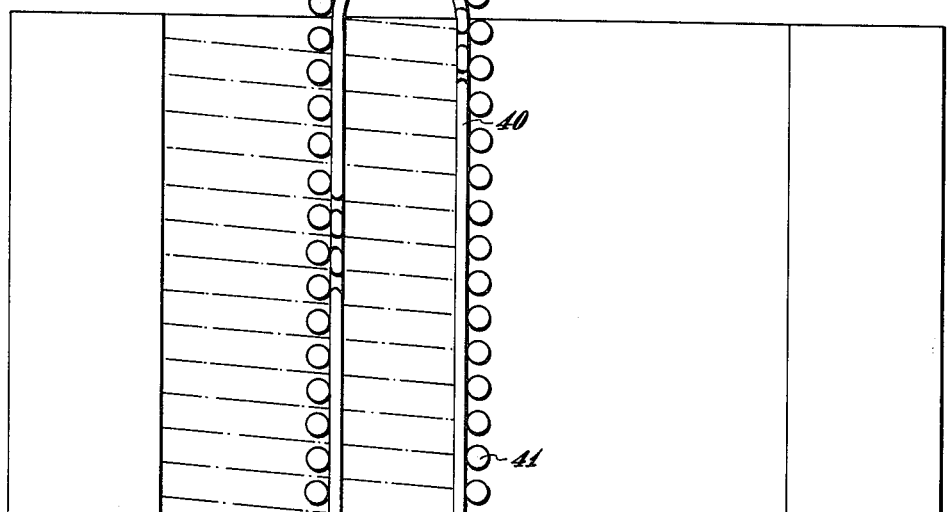
FIGURE 10 is a top elevational view of the apparatus shown in FIGURE 9.

While a particular form of glue applicator has been illustrated in FIGURES 1 and 2 herein it will be recognized that other forms are also within the contemplation of the present invention. For example, as shown in FIGURES 9 and 10 in lieu of an applicator drum rotating about an axis that is parallel to the axis of the winding drum 17, the applicator may take the form of a conveyor 40 carrying an endless series of spaced nozzles 41, which moves in the direction parallel to the longitudinal axis of the winding drum 17, and after wiping the entire width of the strip material 16 returns each separate nozzle in a nonoperative condition back to its original starting point.

It will also be recognized that the glue applicator need not be spaced a substantial distance away from the winding drum 17 but may operate in immediate association therewith.

Figure 11:
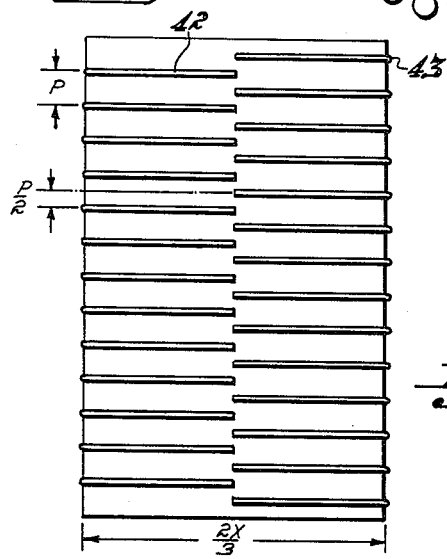
FIGURE 11 is a top plan view of a modified form of adhesive applied drum.
Figure 12:
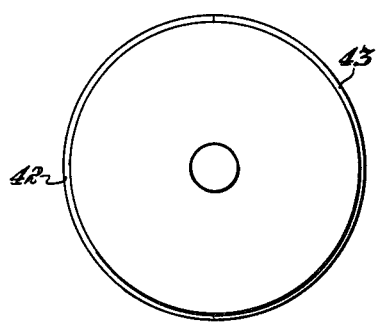
FIGURE 12 is an end view of the drum shown in FIGURE 11.

It is not essential to the present invention that the multi-sheet assembly wound on drum 17 include spiral lines of glue or adhesive. A suitable alternative is the use of non-spiralling glue lines which move sidewise on the sheet material (or lengthwise of the drum) one-half a glue line spacing, every full revolution of the drum, or odd sub-multiple thereof. This may be accomplished by an applicator drum of the type shown in FIGURES 10 and 11 having a diameter of $2X/3$ and having two non-spiralling sets of threads 42 and 43 each extending around half its circumference and each staggered half a glue line spacing relative to the other. Or it may be accomplished by a plurality of nozzles appropriately controlled in synchronism with the rotation of drum 17 and preferably also in response to the build-up of appreciable winding thickness on drum 17.

While the apparatus specifically illustrated herein is adapted to secure successive layers of sheet material on the drum 17 by means of gluing, it is nevertheless to be understood that the novel method of the present invention contemplates the use of any suitable securing means. For example, the strip 16 may be welded or bonded by other like or unlike means, to the outer layer of the previously wound multi-layer assembly on drum 17, at some point after the strip is actually wound upon the drum and before it is covered up by the next full revolution of the drum.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

1. A method of making a honeycomb structure from a single continuous strip of thin sheet material comprising the steps of transferring a continuous strip of material from a supply roll to a take-up drum by winding said material on said take-up drum, simultaneously coating one surface of said continuous sheet of material with a plurality of equispaced, parallel, continuous lines of adhesive, said lines being angularly oriented relative to the path of movement of said sheet but extending generally longitudinally thereof, the spacing and orientation of the lines of adhesive being related to the diameter of said take-up drum, whereby alternate convolutions of said material on said take-up drum are adhesively secured together along lines spaced a distance equal to one-half the spacing between the lines of adhesive initially applied to said continuous sheet, subsequently cutting said adhesively secured sheet assembly along pairs of parallel lines which are substantially parallel to the longitudinal axis of the take-up drum, the cutting lines of each pair being separated by a circumferential distance on the drum which represents a minor part of the drum circumference and subsequently expanding each of the subassemblies thus created in a direction perpendicular to the layers of sheet material thereof so as to form a separate honeycomb structure.

2. A method of making a honeycomb structure from a continuous strip of thin sheet material comprising the steps of transferring a continuous strip of material from a supply roll to a take-up drum by winding said material on said take-up drum, simultaneously coating one surface of said continuous sheet of material with a plurality of equispaced, parallel lines of adhesive, said lines extending longitudinally of the path of movement of said sheet, the transverse position of said lines of adhesive relative to sheet being varied longitudinally of said sheet, the spacing and position of the lines of adhesive being related to the diameter of said take-up drum, whereby alternate convolutions of said material on said take-up drum are adhesively secured together along lines spaced a distance equal to one-half the spacing between the lines of adhesive initially applied to said continuous sheet, subsequently cutting said adhesively secured sheet assembly along pairs of parallel lines which are substantially parallel to the longitudinal axis of the take-up drum, the cutting lines of each pair being separated by a circumferential distance on the drum which represents a minor part of the drum circumference, subsequently removing said convolutions of sheet material from said drum, expanding said adhesively secured superposed sheets to form a honeycomb material.

3. A method of making a honeycomb structure from a single continuous strip of thin sheet material comprising the steps of transferring a continuous strip of material from a supply roll to a take-up drum by winding said material on said take-up drum, engaging one surface of said sheet intermediate said supply roll and take-up drum with an applicator drum havig helical glue applying ribs thereon, the diameter of said applicator drum being twice the diameter of said first drum, said applicator drum coating one surface of said continuous sheet of material with a plurality of equispaced, parallel, continuous lines of adhesive, said lines being angularly oriented relative to the path of movement of said sheet, adhesively securing alternate convolutions of said material on said take-up drum together along lines spaced a distance equal to one-half the spacing between the lines of adhesive initially applied to said continuous sheet, subsequently cutting said adhesively secured sheet assembly along pairs of parallel lines which are substantially parallel to the longitudinal axis of the take-up drum, the cutting lines of each pair being separated by a circumferential distance on the drum which represents a minor part of the drum circumference, and subsequently removing said convolutions of sheet material from said drum, expanding said adhesively secured superposed sheets to form a honeycomb material.

4. A method of making a honeycomb structure from a single continuous strip of thin sheet material comprising the steps of transferring a continuous strip of material from a supply drum to a take-up drum by winding said material on said take-up drum, simultaneously coating one surface of said continuous sheet of material with alternate first and second sets of pluralities of equispaced, parallel, continuous lines of adhesive, said lines being parallel to the path of movement of said sheet, the lines of one set being transversely offset relative to the lines of the second set by an amount equal to one-half the spacing between lines in each set, the longitudinal extent of the lines in each set being related to the diameter of said take-up drum, whereby alternate convolutions of said material on said take-up drum are adhesively secured together along lines spaced a distance equal to one-half the spacing between the lines of adhesive initially applied to said continuous sheet, subsequently cutting said adhesively secured sheet assembly along pairs of parallel lines which are substantially parallel to the longitudinal axis of the take-up drum, the cutting lines of each pair being separated by a circumferential distance on the drum which represents a minor part of the drum circumference, and subsequently removing said convolutions of sheet material from said drum, expanding said adhesively secured superposed sheets to form a honeycomb material.

References Cited by the Examiner

UNITED STATES PATENTS

| | | | |
|---|---|---|---|
| 685,780 | 10/1901 | Martin | 161—146 |
| 765,412 | 7/1904 | Budwig | 156—197 |
| 2,734,843 | 2/1956 | Steele | 156—197 |
| 2,887,425 | 5/1959 | Holland | 156—197 |
| 3,006,798 | 10/1961 | Holland | 156—197 |
| 3,049,167 | 8/1962 | Vesak | 156—548 |
| 3,077,223 | 2/1963 | Hartsell et al. | 156—584 |
| 3,082,141 | 3/1963 | Steele et al. | 156—548 |
| 3,114,666 | 12/1963 | Johnson | 156—197 |

EARL M. BERGERT, *Primary Examiner.*

H. F. EPSTEIN, *Assistant Examiner.*